United States Patent [19]
Carns et al.

[11] Patent Number: 5,222,364
[45] Date of Patent: Jun. 29, 1993

[54] RECOVERY OF AROMA GASES

[75] Inventors: Lawrence G. Carns, Plain City; James Tuot, Dublin, both of Ohio

[73] Assignee: Nestec S.A., Vevey, Switzerland

[21] Appl. No.: 980,025

[22] Filed: Nov. 23, 1992

Related U.S. Application Data

[62] Division of Ser. No. 760,662, Sep. 16, 1991, Pat. No. 5,182,926.

[51] Int. Cl.⁵ .............................................. A23F 1/08
[52] U.S. Cl. ............................................ 62/15; 62/538
[58] Field of Search .................. 62/8, 12, 15, 10, 532, 62/533, 534, 538, 539; 426/478, 486

[56] References Cited

U.S. PATENT DOCUMENTS

| | | | |
|---|---|---|---|
| Re. 24,954 | 3/1961 | Church | 55/302 |
| 3,021,218 | 2/1962 | Clinton et al. | 99/71 |
| 3,535,119 | 10/1970 | Klein et al. | 426/594 X |
| 3,757,497 | 9/1973 | Ray | 55/302 |
| 3,765,904 | 10/1973 | de Roissart et al. | 99/71 |
| 4,007,291 | 2/1977 | Siedlechi et al. | 426/594 |
| 4,854,951 | 8/1989 | Stephenson | 55/294 |
| 4,885,016 | 12/1989 | Griffiths | 62/532 |

Primary Examiner—John C. Fox

[57] ABSTRACT

Coffee aroma gases are conveyed to a cryogenic collector in which liquid nitrogen is sprayed directly into the aroma gas stream to rapidly condense the aroma gas and form finely divided particles of coffee aroma frost suspended in a stream of nitrogen gas, while minimizing contact of the cooled gas with the walls of the collector. The suspension of aroma frost particles in gaseous nitrogen is passed through a tubular porous filter to remove the aroma frost particles which collect on the outer surface of the tubular filter, with the nitrogen gas passing through the porous filter and being exhausted from the collector. The porous filter is periodically back pulsed to dislodge aroma frost particles collected on the outer surface of the tubular filter, with the particles being recovered for incorporation in soluble coffee products.

7 Claims, 2 Drawing Sheets

RECOVERY OF AROMA GASES

This is a divisional of co-pending application Ser. No. 07/760,662 filed Sep. 16, 1991, U.S. Pat. No. 5,182,926.

This invention relates to the recovery of volatile aroma gases. More particularly, the invention relates to the low temperature condensation and recovery of volatile aroma constituents from gases evolved during the processing of beverages, particularly coffee.

BACKGROUND OF THE INVENTION

Gases containing volatile aroma constituents are evolved during one or more stages of processing beverages such as coffee, tea, and cocoa. For example, in coffee processing, gases containing aroma constituents are given off during a number of stages of the processing operation, such as during roasting of whole beans, grinding of the roasting whole beans, extraction of water solubles, steam distillation and the like. It has been recognized that the aroma and flavor of such beverage products, particularly soluble coffee products, can be improved by recovering the aroma gases and incorporating them in the beverage product, such as by addition of the aroma constituents to coffee extract prior to drying or to the dry powder or granules. Frequently coffee aroma gases are recovered by low temperature condensation of the gases at liquid nitrogen temperatures to form a coffee aroma frost. A number of procedures have been suggested heretofore for the recovery of coffee aroma frost. One such procedure which is widely used involves condensing the aroma gases on the walls of a scraped-surface heat exchanger which is cooled by means of liquid nitrogen. The condensed gases are scraped from the walls and collected at the bottom of the heat exchanger in the form of a frost or snow which is recovered. However, this procedure is inefficient and is subject to a number of disadvantages. For example, the total gas stream entering the heat exchanger is not necessarily entirely cooled down and fine frost particles tend to become entrained in the gas stream and leave the heat exchanger without being caught.

SUMMARY OF THE INVENTION

The present invention provides a simple but highly effective and efficient procedure for the collection and recovery of aroma frost from gases evolved during processing of beverage products particularly coffee. The invention will be particularly described with respect to aroma gases evolved during coffee processing; however it is to be understood that other aroma-bearing gases such as those evolved in the manufacture of tea and cocoa, may likewise be employed and are considered to be within the scope of this invention. In the present invention, coffee aroma gases, such as gases evolved during grinding of roasted whole beans, are conveyed to a cryogenic collector in which liquid nitrogen is injected directly into the aroma gas stream to rapidly cool the aroma gas and effect rapid condensation of the aromatic constituents of the gas. Direct contact of the cryogenically cooled aroma gas stream with the walls of the collector is minimized, preferably being avoided. Such cryogenic cooling of the aroma gas stream results in the formation of fine particles of aroma frost suspended in gaseous nitrogen produced by the evaporation of the liquid nitrogen spray. The suspension of aroma frost particles in the nitrogen gas stream thus formed is passed through a one or more porous cylindrical filters mounted in the cryogenic collector to remove the aroma frost particles from the gas stream. The aroma frost particles are retained on the outer or upstream walls of the porous cylindrical filters and form a filter cake on the outer walls. The gas phase of the suspension passes through the walls of the cylindrical filter by maintaining a sufficient pressure differential across the walls, with the gas phase passing to the interior of the cylindrical filters and then being exhausted through the top of the filters to a point outside the collector. The porous filter is periodically back pulsed with nitrogen or other inert gas to dislodge the aroma frost particles from the surface of the filter, with the frost particles falling to the bottom of the collector from where the particles are removed and recovered either on a continuous or a periodic basis.

Preferably, the cold nitrogen gas passing through the porous filter is vented into an insulated housing which surrounds the cryogenic collector thereby maintaining the collector and porous filters at temperatures sufficiently low to maintain the aromatic constituents of the aroma gas in condensed form.

DETAILED DESCRIPTION OF THE INVENTION

Figure 1:
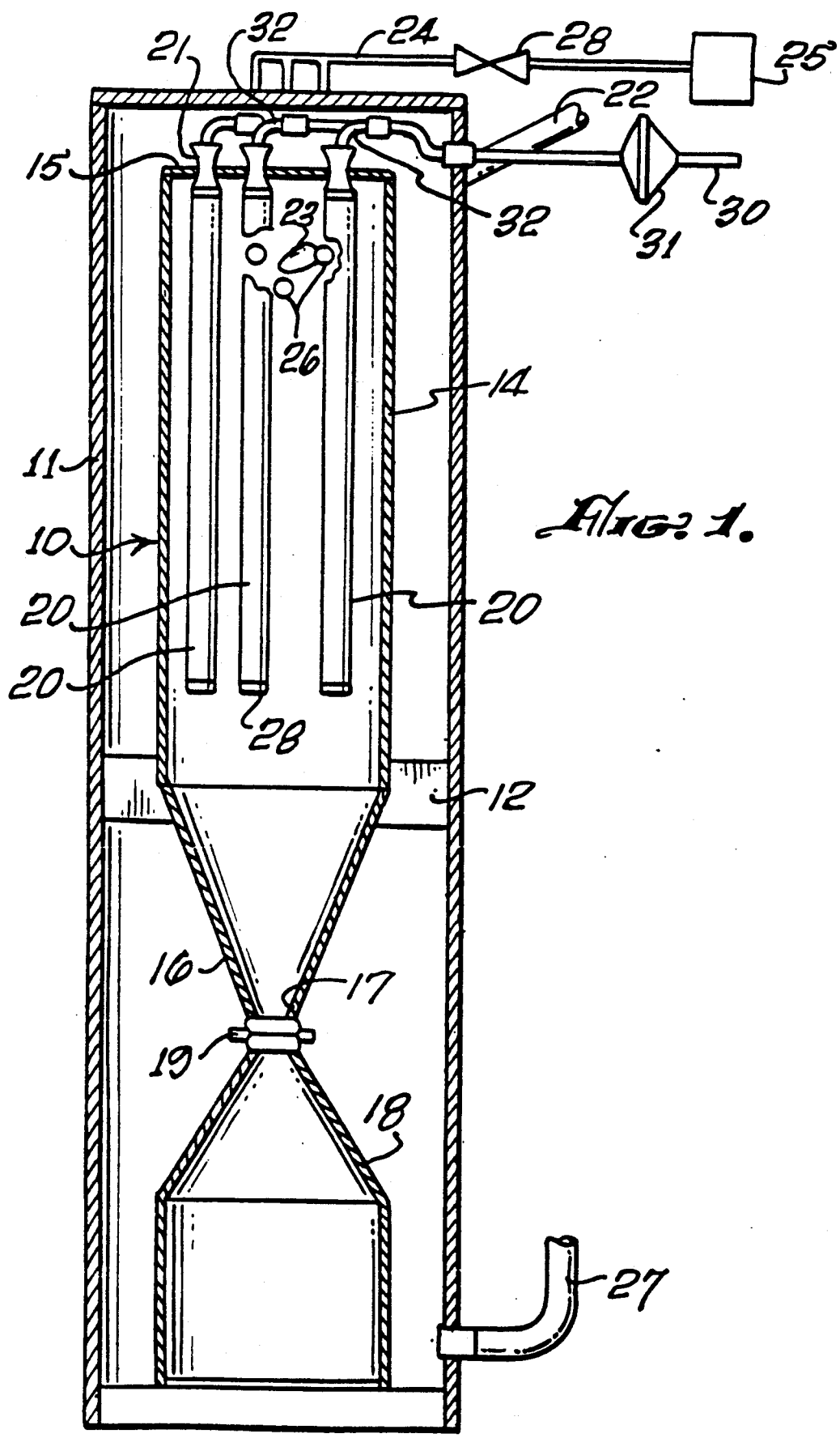
FIG. 1 is a vertical cross-sectional view of an aroma frost recovery unit in accordance with one embodiment the present invention.

The invention will be particularly described with respect to the recovery of aroma gases evolved during coffee processing. It will be understood, however, that the present invention is also applicable to the recovery of other aroma-bearing gases, such as those generated in processing tea and cocoa.

The aroma gas evolved at any one of several points in the processing of coffee may be used in the present invention. For example, gases evolve during roasting of green coffee (i.e. "roaster gases"), gases evolved during grinding of roasted whole beans (i.e. "grinder gases"), and those evolved during infusion or water extraction of ground roasted coffee (i.e. "infusion gases") may be used. Typically the composition of the aroma gases evolved is largely (i.e. up to 90% or more by weight) carbon dioxide together with water vapor and the characteristic aromatic constituents of roasted coffee. If desired, the amount of moisture in the gas may be reduced by passing the evolved gas through a condenser where it is cooled to a temperature between about $-25°$ C. and $10°$ C. in order to remove substantial quantities of water from the gas stream. Where desired, a stream of inert gas, such as nitrogen or carbon dioxide, may be used to sweep the evolved aroma gas from the coffee and carry it through the aroma recovery operation. The aroma gas stream is normally maintained under a pressure sufficient to move the gas through the recovery operation, typically 0.5 to 5 psig, taking into account the pressure drop across the filter units employed. Alternatively, the aroma gases may be pulled from the aroma generating equipment and carried through the aroma recovery operation by means of a vacuum. The use of a vacuum to move the aroma gases eliminates the need for a sweep gas thereby increasing the concentration of the aromatic constituents in the gas stream and increasing the efficiency for condensing the aromatic constituents.

In accordance with the present invention, the coffee aroma gas is carried via suitable piping to a cryogenic collector and liquid nitrogen is sprayed into the aroma gas stream to rapidly cool the gas to a temperature at which finely divided aroma frost particles are condensed, with the aroma frost particles being suspended in nitrogen gas produced by evaporation of the liquid nitrogen with which the aroma gas is contacted. Preferably, the amount of liquid nitrogen sprayed into the aroma gas stream is controlled by use of suitable valve means to cool the gas to a temperature of at least about $-80°$ C. or below, with a temperature of between about $-100°$ C. and $-160°$ C. being more desirable, with the collector being maintained at similar cryogenic temperature levels. Such temperatures serve to effect rapid condensation of the aromatic constituents of the gas stream and maintain the aroma frost well below the boiling point of the most volatile components and below the sublimation point of carbon dioxide, while ensuring that substantially all of the liquid nitrogen sprayed into the gas stream evaporates.

The aroma gas and liquid nitrogen are introduced into the cryogenic collector in a manner which facilitates rapid, substantially uniform cooling of the gas while minimizing or avoiding contact between the cold gas and the walls of the collector. For example, the aroma gas stream may be introduced into the cryogenic collector by means of an inlet pipe which discharges the aroma gas into the center of the collector. In accordance with one embodiment, a plurality of liquid nitrogen spray nozzles are mounted in the collector adjacent the discharge of the aroma gas inlet pipe, and are oriented so that their spray patterns converge at the midpoint of the aroma gas discharge and induct the aroma gas flow into the center portion of the collector. According to another embodiment the liquid nitrogen spray nozzle is mounted coaxially within the aroma gas inlet pipe adjacent the discharge end of the pipe whereby liquid nitrogen is sprayed into the aroma gas in the inlet pipe to produce a suspension of condensed aroma frost particles in nitrogen gas which is carried into the collector.

The suspension of aroma frost particles in nitrogen gas thus formed is directed through one or more rigid porous filters mounted in the cryogenic collector to remove substantially all of the finely divided frost particles from the nitrogen gas. Preferably, the porous filters comprise porous cylindrical tubes, closed at the bottom and having an open upper end, with the gas phase of the suspension passing through the walls of the tubular filter from the outer or upstream surface to the inner or downstream surface of the filter and being discharged through the open upper end. Advantageously, a venturi nozzle is secured over the open upper end of the filter, with the nitrogen gas being exhausted through the venturi.

The porous cylindrical filters used in the present invention have a pore size distribution such that substantially all of the aroma frost particles are removed from the nitrogen gas suspension passing through the filter, with the filters being thermally compatible with the cryogenic conditions maintained in the collector. In addition, the porous filters have sufficient structural strength and durability to withstand cyclic pressure increases during reverse flow cleaning cycles. Filters made of porous ceramic or porous metal such as porous stainless steel, sintered woven wire mesh, and the like are suitable for use in the present invention. Cylindrical filters made of PSS ® porous stainless steel, Grade H, sold by Pall Porous Metal Filters Corporation, Cortland, N.Y., which has an absolute rating of approximately five microns, have been found to be effective in removing over 95% of the aroma frost particles from the gaseous suspension.

The size and number of filters mounted in the collector depends to a large extent on the flow rate of the aroma gas being processed by the cryogenic collector, and can be readily determined by routine experimentation. For example, a single porous stainless steel cylindrical filter 6.1 cm diameter and 50.8 cm in length, having about 960 sq. cm. of filter area and an average pore size of 20 micrometers is effective in removing substantially all of the frost particles from a coffee aroma gas stream having a flow rate of approximately 200 SCFH.

The gas phase of the suspension is forced through the pores of the porous cylindrical filter by maintaining a sufficient pressure differential across the walls of the filter, either by introducing the aroma gas into the collector under pressure or by maintaining the collector under slight vacuum. The gas phase passes through the porous walls to the interior of the cylindrical filter and is exhausted from the cryogenic collector through the open upper end of the filter. This gas phase which has a temperature of about $-140°$ C., may be exhausted to the atmosphere, but preferably is vented into an insulated housing which surrounds the cryogenic collector. Venting the nitrogen gas exhaust stream in this manner is effective in maintaining the temperature of the cryogenic collector sufficiently low (i.e. about $-115°$ C.) to maintain the aroma frost particles in condensed form.

During filtering, aroma frost particles, which are removed from the nitrogen gas suspension passed through the filter, build up and tend to form a filter cake on the outer walls of the cylindrical filter. The accumulating cake of aroma frost particles is dislodged and removed from the filter by periodically directing a pulse of gas, preferably gaseous nitrogen, into the open upper end of the cylindrical filter, at a pressure appreciably greater than on the outer wall of the filter. The pulses are of 0.1 to 1.0 second duration with the pulses being repeated at a time interval in the range of 1 to 3 minutes. Typically nitrogen gas at a pressure of approximately 90 psig is used.

The aroma frost particles dislodged from the filters fall to the bottom of cryogenic collector and are removed either periodically or on a continuous basis. For example conventional means such as a rotary valve, a screw conveyor, and endless belt, and the like may be provided at the bottom of the collector for the removal of the dislodged aroma frost particles from the collector on a continuous basis. Alternatively, an insulated container may be removably secured to the bottom of the collector below the filters, with the dislodged frost particles falling into the container, which is removed periodically for recovery of the aroma frost particles.

The aroma frost thus recovered is effective in improving the aroma and flavor of beverages, particularly soluble coffee. For example, coffee aroma frost particles recovered in accordance with the present invention may be added to jars of soluble coffee powder to aromatize jar headspace and increase the flavor and aroma of the coffee. Alternatively the aroma frost particles may be added to coffee oil and used to aromatize jar head space. In addition, the coffee aroma frost particles may also be added to liquid coffee extract which is then dried, in order to produce an improved cup aroma when the powder is dissolved in hot water.

Referring now to FIG. 1 of the drawings, the aroma frost recovery unit of the present invention includes a cryogenic collector 10 mounted centrally within an insulated cylindrical housing 11 by means of support brackets 12. Cryogenic collector 10 comprises a cylindrical shell 14 closed at the top by wall 15 and having a funnel-shaped bottom section 16 with an orifice 17 through which condensed aroma frost may be removed. Insulated container 18 is removably secured to bottom section 16 by suitable clamping means 19, such as a Tri-clamp fitting. Container 18 is adapted to be removed periodically through a door (not shown) in the base of housing 11.

Tubular porous filters 20, of suitable cryogenic filtering material, for example, porous stainless steel are mounted within collector 10 adjacent the top wall 15 thereof. Filters 20 are closed at the bottom end such as by welded end cap 28 and have an open upper end, with a venturi nozzle 21 being secured over the open upper end of each tubular filter 20. Each of the venturi nozzles 21 extends through a suitable opening in top wall 15 of collector 10 to exhaust gas from the interior of a tubular filter 20 out of cryogenic collector 10 into cylindrical housing 11 from which the gas is discharged through exhaust line 27. Inlet tube 22, which carriers aroma gas evolved during coffee processing, communicates with the interior of collector 10 through opening 23 in the upper portion of shell 14. Inlet tube 22 is disposed normal to the sidewall of shell 14 at a slight downward angle so as to direct the flow of aroma gas discharged from the tube 22 toward the vertical midline of shell 14, away from the sidewalls. Liquid nitrogen from supply tank 25 is carried in line 24 into collector 10 with the liquid nitrogen being sprayed from nozzles 26 mounted in collector 10 adjacent the discharge end of inlet tube 22. Spray nozzles 26 are oriented so that their spray patterns are directed away from the sidewalls of shell 14, toward the center of the aroma gas stream discharged through opening 23. A suitable nitrogen vent valve 28 is provided in line 24 to control the temperature within the cryogenic collector 10 by increasing or decreasing the flow of liquid nitrogen to spray nozzles 26.

Pressurized nitrogen gas is carried in line 30 to pulsing tank 31, with a periodic back-pulse of nitrogen gas being introduced into the interior of tubular filters 20 through pulse lines 32 which extend, coaxially into each of the venturi nozzles 21 mounted on tubular filters 20. Any of the pulse generating means commonly used to generate pulses of pressurized back flushing gas may be used in the present invention.

Figure 2:
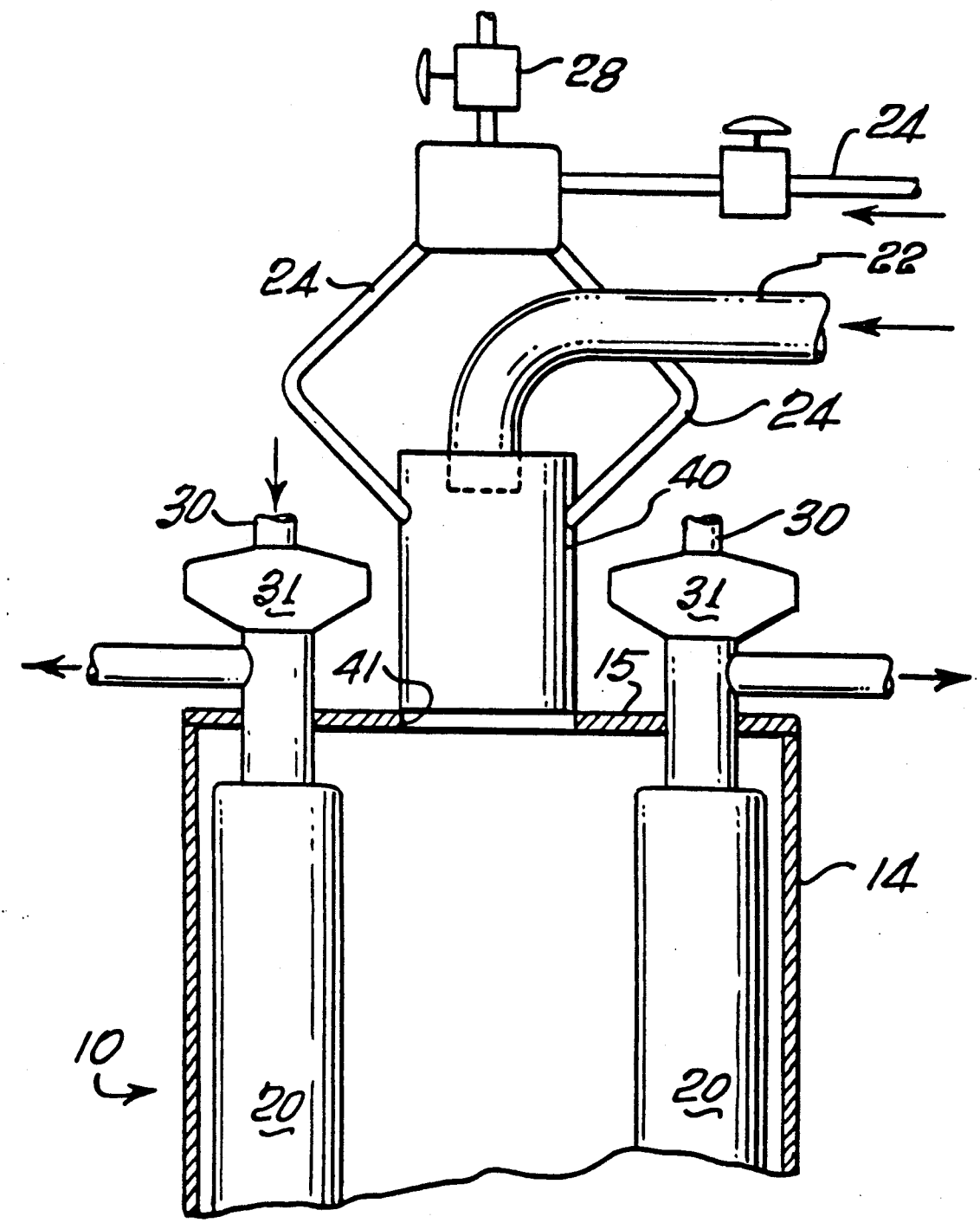
FIG. 2 is a side plan view, partly cut away, of the upper portion of another embodiment of the aroma frost recovery unit of this invention.

FIG. 2 shows a modified arrangement for introducing the aroma gas stream and the liquid nitrogen into the cryogenic collector. In this embodiment, cryogenic collector 10 includes a cylindrical housing 40 which is mounted on top wall 15, with the interior of housing 40 being in communication with the interior of collector 10 through central opening 41 in the top wall. Aroma gas inlet pipe 22 extends through the top of housing 40 at the center thereof so as to discharge a stream of aroma gas vertically downward in housing 40 and shell 14. Liquid nitrogen is carried to the collector in lines 24, with the liquid nitrogen being sprayed into the aroma gas stream through a plurality of nozzles (not shown) spaced equidistant around the housing adjacent the discharge end of inlet pipe 22. The spray nozzles are oriented so that their spray patterns converge at the center of the housing a short distance below the discharge end of inlet pipe 22, with the nozzles being pitched at a downward angle of about 30° so as to induct the aroma gas stream into the shell portion of collector 10. This arrangement is particularly effective in the uniform, rapid cooling of the aroma gas stream to cryogenic temperatures while minimizing contact between the cooled gas and the walls of the collector.

In operation, wherein the apparatus shown in FIG. 1 is used, coffee aroma gas comprising primarily carbon dioxide together with small amounts of water vapor and coffee aroma constituents, which is evolved during coffee processing operations, is carried in tube 22. The aroma gas, which typically is under a pressure of between about 0.5 to 5 psig, is discharged into cylindrical shell 14 in a downwardly direction, toward the center of the shell and away from the sidewalls thereof. Liquid nitrogen is sprayed into the aroma gas stream through nozzles 26 mounted within casing 14 equidistant around the discharge of tube 22 with the liquid nitrogen spray being directed toward the center of the collector so that the aroma gas stream discharged from tube 22 is rapidly and uniformly cooled to condense the aroma gas as finely divided frost particles suspended in a stream of nitrogen gas, while avoiding or minimizing contact of the cooled aroma gas stream with the sidewalls of shell 14. The supply of liquid nitrogen to nozzles 26 is adjusted to maintain the temperature in collector 10 below $-80°$ C., usually between about $-140°$ C. and $-150°$ C. to maintain the aroma frost particles at a temperature below the boiling point of its most volatile constituents while ensuring that substantially all of the liquid nitrogen is volatilized. Three rigid tubular porous metal filters 20 are mounted in collector 10 adjacent its top wall, with each of the filters having a venturi nozzle 21 attached to the upper end of the filter. Each of the nozzles 21 extends through the topwall of the collector 10. The filters are made of porous stainless steel having a removal rating of 5 microns with the tubular filters having a length of about 50 cm and a diameter of about 6 cm. The nitrogen gas phase of the suspension is forced through the pores of the filter tubes by maintaining a pressure differential of about 25 to 50 cm of water across the walls of the filters, while the aroma frost particles are deposited on the outer surface of the filters. The nitrogen gas which is at a temperature of about $-140°$ C. passes through the porous filter walls to the interior of the filters, through the venturi nozzle at the top of each filter, and is vented from collector 10 into the interior of insulated housing 11 surrounding shell 14, from where it is exhausted to the atmosphere through exhaust line 27. In this manner the temperature within the housing is maintained at about $-120°$ C. or below. The tubular filters are back pulsed every 60 seconds for a period of 0.3 second with nitrogen gas at a pressure of about 90 psig to dislodge aroma frost particles which collect on the exterior of the filters, with the frost particles being collected in container 18. The aroma frost particles are periodically removed from container 18 for incorporation in liquid coffee extract or in soluble coffee particles to increase the roast and ground coffee aroma and flavor.

In an alternative mode of operation, the recovery of aroma gas can be carried out in a manner to effect fractionation of the aromatic constituents of the gas. That is, the aroma-bearing gas stream is passed through a number of cryogenic collectors, such as that shown in FIG. 1, in series, with each succeeding collector being operated at a lower temperature than the one preceding it. In this manner a series of aromatic constituents having successively lower freezing points are condensed out of the aroma gas stream and recovered. Each of the series of cryogenic collectors is provided with temperature control means to maintain the temperature in each collector within a predetermined range. Suitable temperature control means include, for example, a temperature controller associated with each collector for determining the temperature within the collector and comparing it to a set point temperature. The temperature controller is also associated with and controls a vent valve of the liquid nitrogen supply tank to the collector. If the temperature in the collector is below the preset level, the vent value is opened further to allow more nitrogen gas to escape. This escape of gas reduces the pressure within the liquid nitrogen supply tank, thus reducing the pressure drop across the spray nozzle in the collector. By reducing the pressure drop across the nozzle, the flow of liquid nitrogen is reduced and the temperature within the collector rises. Similarly, if the temperature in the collector is too high, the vent valve is closed, which increases the flow of liquid nitrogen to the spray nozzle, thereby reducing the temperature in the collector.

This accurate control of temperature within the collectors enables a number of collectors to be connected in series and operated at successively lower temperatures, thereby effecting fractionation of the aromatic constituents of the aroma gas.

What is claimed is:

1. Apparatus for recovering aroma constituents from an aroma-containing gas given off during the processing of a beverage, which comprises a cryogenic collector having a sidewall with gas inlet means, a topwall with gas outlet means, and a bottom wall having a particle discharge opening extending therethrough, at least one porous cylindrical filter means mounted in said chamber intermediate the gas inlet means and the gas outlet means, means for introducing an aroma-containing gas through said gas inlet into said collector toward the vertical midline of said collector, means for introducing a liquefied gas into said aroma containing gas in the collector to cool the aroma gas to a temperature at which aroma frost particles are condensed from the aroma gas and the liquefied gas is volatilized to form a suspension of aroma frost particles in the gas, means for moving the suspension through said filter means whereby the aroma frost particles are retained on the surface of said filter means and said volatilized gas passes through the filter means and is discharged from the cryogenic collector through said gas outlet means, back pulsing means associated with the filter means for generating pulses of backflushing gas to dislodge aroma frost particles from said filter means, and means for recovering the aroma frost particles.

2. The apparatus defined in claim 1 in which said cryogenic collector is mounted in an insulated housing which surrounds said collector, with the volatilized gas being vented from the cryogenic collector into the housing to maintain the collector at cryogenic temperatures.

3. The apparatus defined in claim 1 in which the means for introducing liquefied gas comprises a plurality of spray nozzles mounted in the cryogenic collector equidistant around said gas inlet and adapted to spray liquefied gas into the gas toward the vertical midpoint of the incoming aroma gas stream.

4. The apparatus defined in claim 1 in which said gas inlet means comprises an inlet tube mounted over an opening in the sidewall of the cryogenic collector adjacent the topwall of the collector, said inlet tube being disposed normal to the sidewall at a slight downward angle.

5. The apparatus defined in claim 1 in which said means for recovering aroma frost particles comprises an insulated container removably secured to the bottom wall of the collector over said discharge opening.

6. The apparatus defined in claim 1 in which the cryogenic collector includes a cylindrical housing mounted on the top wall of the collector, with the housing being in communication with the interior of the collector, said housing having a topwall with a gas inlet pipe extending therethrough and a plurality of liquefied gas inlet lines mounted in the housing substantially equidistant around the end of the gas inlet pipe with said gas inlet lines being positioned so that liquefied gas discharged from said inlet lines converge at the center of the housing.

7. The apparatus defined in claim 1 in which each porous cylindrical filter is made of porous stainless steel.

* * * * *